April 10, 1956  E. S. STACK  2,741,227
WATER HEATER
Filed April 22, 1952  2 Sheets-Sheet 1
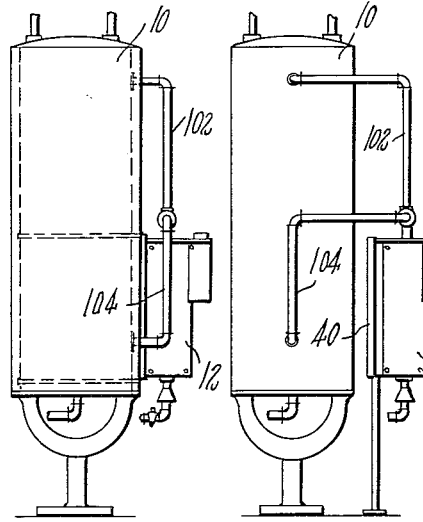
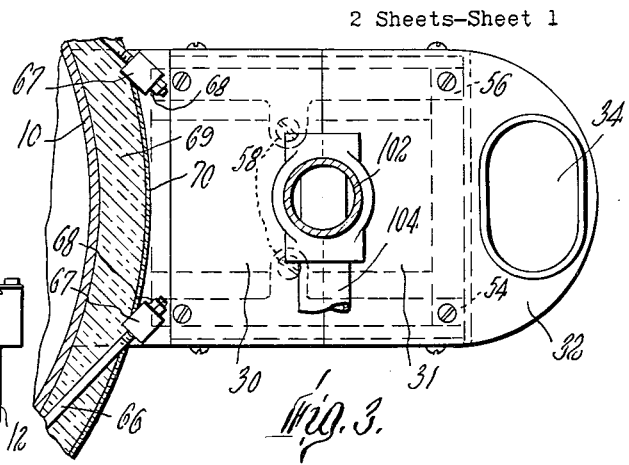
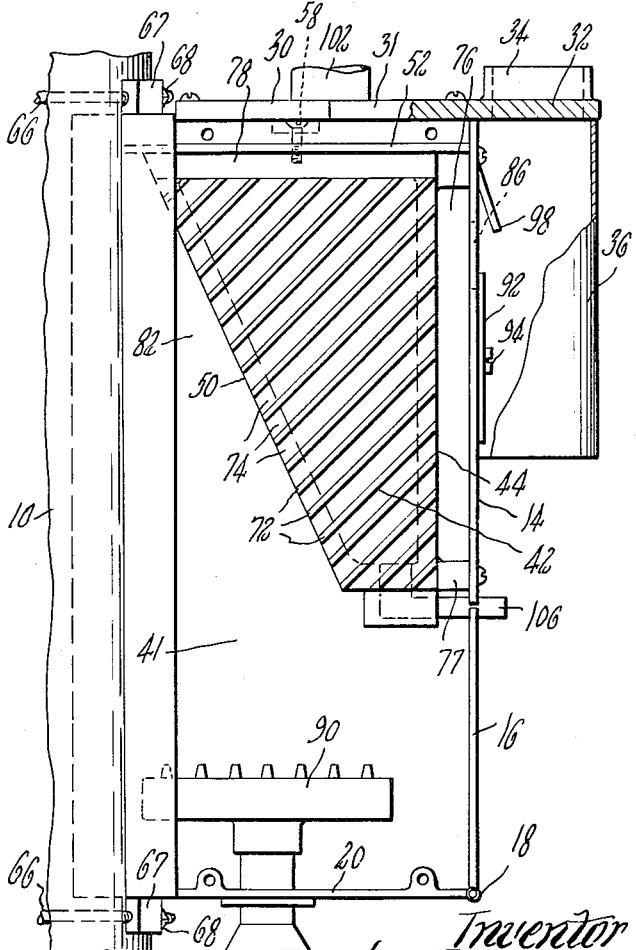
Inventor
Elmer S. Stack
by Wright, Brown,
Quinby & May
Attys.

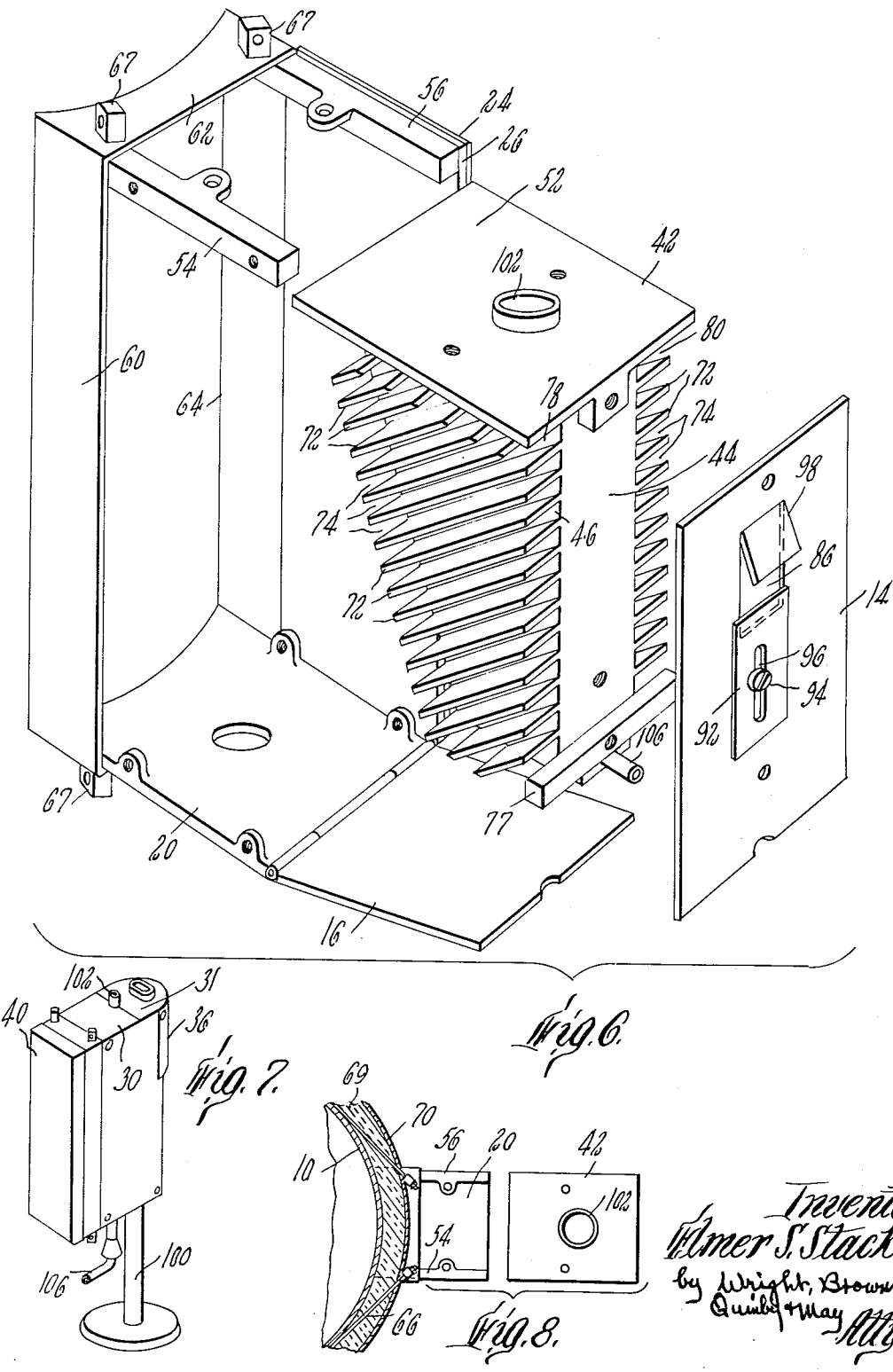

United States Patent Office 2,741,227
Patented Apr. 10, 1956

2,741,227
WATER HEATER

Elmer S. Stack, Arlington, Mass.; Eva D. Stack, administratrix of said Elmer S. Stack, deceased Application April 22, 1952, Serial No. 283,619

2 Claims. (Cl. 122—19)

This invention relates to a heater by which heat from combustion gases is transferred to water. It is an object of the invention to provide a heater which operates more efficiently than prior heaters of the same type and which is easier and cheaper to make and install. It is another object of the invention to provide a heater which can be attached to the side of a hot water storage tank as shown in my Patents Nos. 2,311,484 and 2,352,919 but which can be easily taken apart for cleaning or repair without disturbing the part that is in direct contact with the tank. Thus if the tank is covered with heat insulating material except where the heater abuts it, the heater may be taken apart without injuring the insulation or disturbing the outer steel casing which usually overlies the insulation.

Various other advantageous features will be apparent from the following description of the invention and in the drawing thereof, of which—

Figure 1 is an elevation of a hot water storage tank to which is attached a heater embodying the invention;

Figure 2 is an elevation of a hot water storage tank to which a heater is connected by pipes but is not in abutting relation;

Figure 3 is a plan view of the heater attached to the tank;

Figure 4 is a front elevation of the heater, portions being broken away to show interior parts;

Figure 5 is a side elevation of the heater with a side plate removed to show the interior;

Figure 6 is an exploded perspective view of some of the parts of the heater;

Figure 7 is a perspective view of the heater mounted on a pedestal; and

Figure 8 is a plan view of two separated parts of the heater, one of the parts being secured to a tank, a portion of which is shown in section.

Figures 1 and 2 of the drawing show a conventional vertical storage tank 10 to which is connected a water heating apparatus 12 embodying the invention. This apparatus may be secured directly against the side of the tank as indicated in Figure 1 or may be set up apart from the tank. In either case it is connected to the tank by pipes. The heater 12 comprises a casing having a front wall consisting of a fixed upper portion 14 removably secured in place by screws, and a lower portion 16 hinged at 18 to the bottom 20 of the casing. Removable plates 22 and 24 constitute side walls for the casing, these plates being preferably lined with sheets or slabs 26 of asbestos or other heat insulating material. The casing is provided with a top member in two parts 30 and 31. The latter projects forward beyond the front wall 14 as at 32, this forward projection having an aperture 34 therein above an uptake 36, the latter being formed by a metal sheet bent around to fit the contour of the projection 32, the side margins of the sheet overlapping and being secured to the forward margins of the side walls 22 and 24.

The casing may be open at its rear so that combustion gases can impinge directly on the wall of the tank 10 if the apparatus is secured against the tank as indicated in Figure 1. If the heater is set up apart from the tank 10 a back member 40 is secured to the side walls and top of the casing to enclose a combustion chamber 41 together with the side walls 22 and 24 and the front wall members 14 and 16.

Within the casing is mounted a water container 42 which, as shown in Figure 6, may be a single casting comprising a hollow body member with a vertical front wall 44, vertical side walls 46 and 48 (Figure 4) and a rear wall 50 which, as indicated in Figure 5, is preferably inclined so that the side elevation of the container is a trapezoid with the longer base uppermost. The top 52 of the container is a flat plate, the margins of which project out beyond the four walls of the container. The container is supported by two horizontal frame members 54 and 56 to which the top 52 is secured by suitable screws 58. The side walls 22 and 24 of the casing are also secured at their upper margins to the frame members 54 and 56 and at their lower margins to the bottom 20 of the casing. Thus the side walls and the front wall 14 are readily removable to permit access to or removal of the container 42 for cleaning, repair or replacement. The frame members 54 and 56 are permanently secured to the casing members 60, 62 and 64 which with the bottom member 20 form a unitary portion of the casing adapted to be permanently attached to a tank 10 by suitable metal straps 66 which pass around the tank, the ends of the straps being thrust through lugs 67 and secured by nuts 68 on threaded ends of the straps. If the heater is installed on a new tank, the insulation 69 may be applied to the tank afterward, the insulation being preferably protected by an outer casing 70 of thin sheet metal such as steel. The straps 66 are thus embedded in the insulation. Neither the straps 66 nor the insulation 69 nor the outer tank casing 70 need to be disturbed when the side walls 22 and 24, front wall member 14 of the heater casing and the container 42 are detached for cleaning, repair or replacement.

The side walls 46 and 48 of the container 42 are provided with integral fins 72 which project outward from the wall in parallel planes perpendicular to the walls. These fins are longitudinally inclined preferably at an angle of approximately 45 degrees, and are spaced apart. When the container 42 is enclosed in the casing, the fins 72 extend laterally to the side walls of the casing and form therewith a series of inclined passages 74. The front wall 44 of the container is spaced from the front wall 14 of the casing, thus forming a vertical flue 76 between these front walls. The lower end of this flue is closed by a transverse barrier member 77 which makes it necessary for combustion gases entering the flue to pass first through the passages 74. Beneath the side margins of the top plate 52 of the container are horizontal flues 78 and 80. Back of the rear wall 50 of the container is a flue 82 which is an extension of the combustion chamber 41 and which tapers upwardly from a maximum width at the lower end of the container to a minimum width at the upper end thereof. The inclined passageways 74 between the fins 72 extend upward and forward from the flue 82 to the horizontal flues 78 and 80 and the front flues 76. Since these passages slope upward they are conducive to the flow of combustion gases therethrough. The front flue 76 communicates with the uptake 36 through an aperture 86 which is lower than the horizontal flues 78 and 80. Gases from the combustion chamber 41 reach the aperture by the flues and passageways described and escape through the opening 34 into a suitable chimney (not shown). A gas burner 90 or other source of heat provides hot combustion gases in the chamber 41. The walls of the container and the fins 72 have considerable surface area over which the gases flow and to which heat is imparted to be conducted to the water within the container.

In order to regulate the rate of flow of gases through these various flues it may be desirable to adjust the size of opening of the aperture 86 through which the gases pass to the uptake 36. This may be done by any suitable means such as a shutter plate 92 which can be moved adjustably to close any desired fraction of the area of the aperture 86, the shutter plate being held in adjusted position by a screw 94 which extends through a slot 96 in the plate and into the front wall 14 of the casing. In order to protect the burner 90 from adverse effects of possible momentary down drafts in the uptake, a deflector 98 is secured to the front wall immediately above the aperture.

The container is provided with suitable connections for the introduction and discharge of water. If the heating apparatus is used apart from the storage tank it may be conveniently mounted on a pedestal 100 as illustrated in Figure 7. An outlet pipe for the discharge of water from the container is shown at 102.

An inlet pipe 104 may enter the container within the outlet pipe in the manner indicated in my Patent 2,352,919. A drain outlet 106 is provided at the bottom of the water container 44 for flushing purposes and for draining the water from the container if it is to be exposed to freezing conditions.

I claim:

1. A water heater comprising a casing having a top, a bottom and front and parallel side walls, said front wall having a discharge aperture near the upper end thereof, a water container mounted within said casing, said container having a vertical front wall spaced from the front wall of the casing to provide a front flue, said container having parallel side walls of trapezoidal shape spaced from the side walls of the container and tapering downward from a maximum width at the top of the container to a minimum width at the bottom thereof, said container having a top with horizontal flues extending along said top, said container having a rear wall sloping downward and forward to define an upwardly tapering rear flue, fins integral with and projecting from each side wall of the container to the corresponding side wall of the casing, said fins defining passages sloping forward and upward from the said rear flue to the said front and top flues, and an uptake communicating with said discharge aperture to lead away combustion gases from said flues.

2. A water heater comprising a casing having a top, a bottom, vertical front and rear walls, and vertical side walls, said front wall having a discharge aperture near the upper end thereof, a water container mounted within said casing, said container having a vertical front wall spaced from the front wall of the casing to provide a front flue of substantially uniform cross-section, said container having vertical side walls equally spaced from the side walls of the casing to provide mutually similar side flues, said container having a rear wall sloping downward and forward to provide a rear flue which tapers upward from a maximum width at the level of the bottom of the container to a minimum width at the level of the top of the container, the top of said container being uniformly spaced from the top of the casing to provide a horizontal top flue extending from the upper end of the rear flue to the upper end of the front flue, fins integral with and projecting from each side wall of the container to the corresponding side wall of the casing, said fins defining passages sloping forward and upward from the rear flue to the front and top flues, and an uptake communicating with said discharge aperture to lead away combustion gases from said flues.

References Cited in the file of this patent

UNITED STATES PATENTS

| | | |
|---|---|---|
| 519,132 | Morgan | May 1, 1894 |
| 2,017,251 | Klein | Oct. 15, 1935 |
| 2,090,053 | Kuenhold | Aug. 17, 1937 |
| 2,311,484 | Stack | Feb. 16, 1943 |
| 2,352,919 | Stack | July 4, 1944 |